(12) United States Patent
Woo et al.

(10) Patent No.: US 11,643,020 B2
(45) Date of Patent: May 9, 2023

(54) GLOVE BOX FOR VEHICLES

(71) Applicants: HYUNDAI MOTOR COMPANY, Seoul (KR); KIA CORPORATION, Seoul (KR)

(72) Inventors: Jung Hoon Woo, Suwon-si (KR); Kwan Woo Lee, Suwon-si (KR); Sang Ku Hur, Hwaseong-si (KR); Ik Jin Jung, Hwaseong-si (KR); Jin Tae Kim, Suwon-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 45 days.

(21) Appl. No.: 17/537,833

(22) Filed: Nov. 30, 2021

(65) Prior Publication Data
US 2022/0289114 A1    Sep. 15, 2022

(30) Foreign Application Priority Data

Mar. 12, 2021    (KR) .......................... 10-2021-0032464

(51) Int. Cl.
*B60R 7/06* (2006.01)
(52) U.S. Cl.
CPC ..................... *B60R 7/06* (2013.01)
(58) Field of Classification Search
CPC ........................................................ B60R 7/06
USPC ..................................................... 296/37.12
See application file for complete search history.

(56) References Cited

U.S. PATENT DOCUMENTS

| | | | | |
|---|---|---|---|---|
| 7,293,815 B2* | 11/2007 | Hwang | ................ | A47B 88/443 296/37.1 |
| 11,124,125 B2* | 9/2021 | Faarup | ...................... | B60R 7/04 |
| 2005/0134073 A1* | 6/2005 | Tokutomi | ................. | B60R 7/04 296/37.8 |
| 2010/0148531 A1* | 6/2010 | Evans | ....................... | B60R 7/06 16/277 |
| 2013/0257247 A1* | 10/2013 | Doll | .......................... | B60R 7/04 312/319.7 |
| 2017/0218664 A1* | 8/2017 | Ben Abdelaziz | ......... | B60R 7/06 |
| 2020/0130594 A1* | 4/2020 | Park | ........................... | B60R 7/06 |

FOREIGN PATENT DOCUMENTS

| | | | |
|---|---|---|---|
| KR | 10-1999-0035700 A | | 5/1999 |
| KR | 10-2017-0134717 A | | 12/2017 |

* cited by examiner

*Primary Examiner* — Pinel E Romain
(74) *Attorney, Agent, or Firm* — Morgan, Lewis & Bockius LLP (57) ABSTRACT

A glove box for vehicles configured to be inserted into a part of a dashboard and to be withdrawn therefrom includes a housing having a storage space of the glove box, and guide units disposed on two side surfaces of the housing, respectively, and configured to move the housing along the inner surface of the dashboard, and each of the guide units includes a guide part configured to move along a corresponding one of rails located on two inner side surfaces of an opening formed in the part of the dashboard, and a fixing part located on the guide part and inserted into an insertion recess located on one of the rails so as to prevent movement of the housing in a withdrawn state of the housing.

10 Claims, 5 Drawing Sheets

GLOVE BOX FOR VEHICLES

CROSS-REFERENCE TO RELATED APPLICATION

This application claims the benefit of priority to Korean Patent Application No. 10-2021-0032464 filed on Mar. 12, 2021 in the Korean Intellectual Property Office, the entire contents of which are incorporated herein by reference.

TECHNICAL FIELD

The present disclosure relates to a glove box. More particularly, it relates to a structure for preventing stored objects from being released from a glove box through the rear surface of a housing forming the glove box.

BACKGROUND

In general, an instrument panel called a dashboard is installed in front of a driver's seat of a vehicle, and a control panel having various gauges and warning lights configured to facilitate safe driving of the vehicle is installed on the instrument panel so that a driver may frequently grasp the driving state of the vehicle so as to more safely and smoothly drive the vehicle.

That is, on the control panel installed on the instrument panel, a tachometer which indicates RPM of an engine per minute so as to assist the driver in selecting a timing of changing speed and to detect the over-rotation of the engine, a speedometer which indicates the driving speed of the vehicle so as to prevent speeding of the vehicle, a tripmeter and an odometer which indicate a distance traveled by the vehicle, etc. are installed.

Further, on the control panel, a thermometer which indicates the temperature of a coolant of the engine, a fuel gauge which indicates the residual amount of fuel in a fuel tank, various warning lights, such as a turn signal light, an emergency warning light, a battery warning light which is turned on when a battery is not capable of being charged, and a warning light which is turned on when engine oil is deficient, are gathered, and various levers or buttons required to operate heating and cooling systems, such as a heater and an air conditioner, are installed at the right side of the control panel.

Further, because a region of the instrument panel, which is located in front of a passenger seat, is far away from a driver's view and thus the above-described gauges and warning lamps are not installed in this region, a glove box configured to store objects necessary for the driver is installed in this region.

The glove box is formed as an enclosure configured to have a storage space formed therein, and is a device which may store various small articles so as to increase passenger convenience.

A conventional glove box for vehicles is configured such that locking of a door box into the glove box is released by rotating a handle disposed on the door box upwards, and the door box is opened by rotating an operating structure or a handle for opening the door box to the outside of the instrument panel.

In the glove box withdrawn towards the interior of the vehicle, objects within the glove box may be released to a space between the dashboard and the glove box due to a clearance formed at the upper end of the dashboard.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a glove box for vehicles in which a protrusion unit is provided to prevent a step formed between the upper end of a dashboard and the rear surface of the glove box.

It is another object of the present disclosure to provide a glove box for vehicles in which a glove box housing is easily moved through a forming unit formed on the upper surface of a dashboard corresponding to a protrusion unit.

In one aspect, the present disclosure provides a glove box for vehicles configured to be inserted into a part of a dashboard and to be withdrawn therefrom. the glove box may include a housing having a storage space of the glove box, and guide units disposed on two side surfaces of the housing and configured to move the housing along an inner surface of the dashboard. Each of the guide units may include a guide part configured to move along a corresponding one of rails located on two inner side surfaces of an opening formed in the part of the dashboard such that the housing is inserted into the opening, and a fixing part located on the guide part and inserted into an insertion recess located on one of the rails so as to prevent movement of the housing in a withdrawn state of the housing.

In a preferred embodiment, the glove box for vehicles may further include a protrusion unit located at an upper end of a rear surface of the housing and protruding along the upper end of the rear surface of the housing, and a forming unit located in an inner upper surface of the opening formed in the part of the dashboard, in which at least a part of the protrusion unit is inserted into the forming unit and moved integrally with the housing.

In another preferred embodiment, the protrusion unit may include at least two protrusions extending along the upper end of the rear surface of the housing in a height direction thereof, and the forming unit may include depressed regions corresponding to the at least two protrusions, and is configured to correspond to movement of the at least two protrusions.

In still another preferred embodiment, in a closed state of the housing, the protrusion unit may be located adjacent to an upper surface of the depressed regions of the forming unit and, when the housing is converted into an open state along the forming unit, the protrusion unit may be located adjacent to an upper surface of the dashboard.

In yet another preferred embodiment, the rails may be inclined at a designated angle so that, when the housing is moved in a length direction thereof, the housing is moved downwards.

In still yet another preferred embodiment, a height by which the housing is moved downwards may be smaller than a height of the protrusion unit.

In a further preferred embodiment, a width of the forming unit may be greater than a width of the protrusion unit.

In another further preferred embodiment, the fixing part may be inserted into the insertion recess formed in at least one of two end portions of each of the rails so as to fix the housing in an open and/or closed state of the housing, and may be released from the insertion recess by external force applied to the housing.

In still another further preferred embodiment, an elastic roller pressed against the insertion recess and rotated depending on sliding of the housing may be disposed at an end of the fixing part, and an elastic adjustment screw screwed to the guide part to compress or relax a spring, which is configured to elastically support the fixing part, through forward or reverse rotation of the elastic adjustment screw so as to adjust elastic force applied to the fixing part.

In yet another further preferred embodiment, the glove box for vehicles may further include sliding rail units installed between the housing and the dashboard so as to guide sliding of the housing.

Other aspects and preferred embodiments of the present disclosure are discussed infra.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various embodiments of the present disclosure, examples of which are illustrated in the accompanying drawings and described below. While the present disclosure will be described in conjunction with exemplary embodiments, it will be understood that the present description is not intended to limit the disclosure to the exemplary embodiments. On the contrary, the present disclosure is intended to cover not only the exemplary embodiments, but also various alternatives, modifications, equivalents and other embodiments, which may be included within the spirit and scope of the disclosure as defined by the appended claims.

In the following description of the embodiments, it will be understood that the suffixes " . . . part", " . . . unit", " . . . housing" and the like indicate units for processing at least one function or operation, and may be implemented using hardware, software or a combination of hardware and software.

In addition, in the following description of the embodiments, it will be understood that, the "upper surface" or the "side surface" of a dashboard may mean one surface of the dashboard opposite a housing, into which a glove box is inserted.

Moreover, in the following description of the embodiments, the same or corresponding elements are denoted by the same reference numerals even when they are depicted in different drawings, and a detailed description thereof will thus be omitted because it is considered to be unnecessary.

The present disclosure relates to a glove box 10 located inside a dashboard 200 of a vehicle, and particularly, to the glove box 10 which is inserted into a designated region of the dashboard 200 so as to be selectively popped up towards the interior of the vehicle. More particularly, the glove box 10 may be configured to be slidably opened along a part of the dashboard 200.

The glove box 10 may be inserted into the dashboard 200 so as to be located therein, and is configured such that a housing 100 of the glove box 10 moves along the inner side surfaces of an opening in the dashboard 200 and the upper end of the rear surface of the housing 100 moves adjacent to the upper surface of the dashboard 200.

In the present disclosure, the upper end of the housing 100 may be defined in the height direction of the glove box 10, the state of the glove box 10 in which the housing 100 is withdrawn towards in the interior of the vehicle may be defined as an withdrawn state, and the state of the glove box 10 in which housing 10 is inserted into the opening in the dashboard 200 so that the outer surface of the housing 100 including a handle 400 and the outer surface of the dashboard 200 are substantially coplanar may be defined as a closed state.

Further, the glove box 10 may include the handle 400 configured to release locking of the glove box 10 into the dashboard 200 and to move the glove box 10 in response to user input, and the glove box 10 may be locked into and unlocked from the dashboard 200 in various manners.

Figure 1:
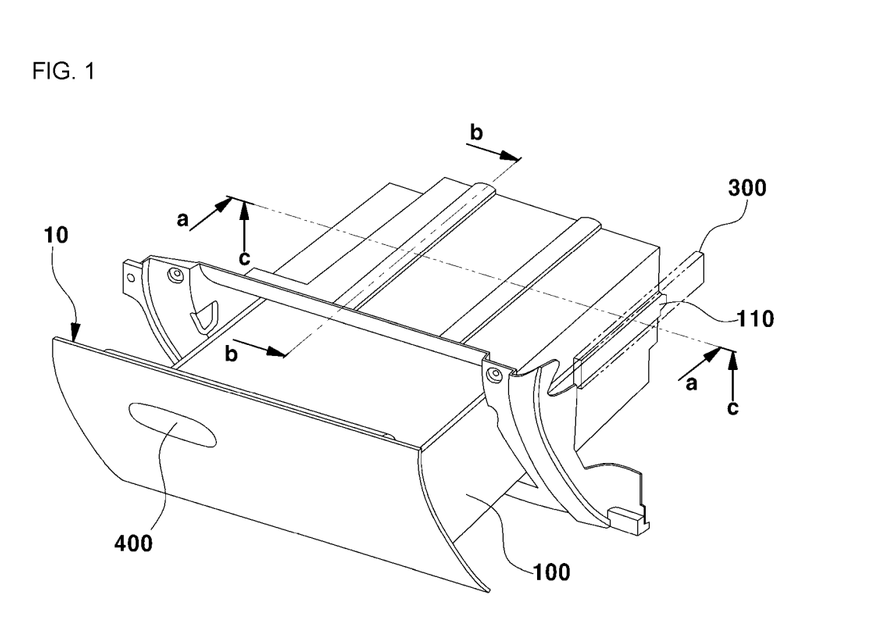
FIG. 1 is a perspective view of a glove box for vehicles according to one exemplary embodiment of the present disclosure.

FIG. 1 is a perspective view the glove box 10 according to one exemplary embodiment of the present disclosure.

The glove box 100 includes the housing 100 including a designated depressed region configured to store various objects, guide units 110 located on both side surfaces of the housing 100 and coupled to rails 300 formed in the dashboard 200 so as to be moved along the rails 300, and a protrusion unit 120 located at the upper end of the rear surface of the glove box 10 so as to be located adjacent to the upper surface of the dashboard 200 when the glove box 100 is inserted into the dashboard 200.

The housing 100 is a storage space which is formed in a depressed shape, the guide units 110 are located on both side surfaces of the housing 100 opposite the inner side surfaces of the opening in the dashboard 200, and thus, the housing 100 is slidably moved towards the interior of the vehicle along the inner side surfaces of the opening in the dashboard 200.

The rails 300 extend in the length direction of the vehicle on both inner side surfaces of the opening in the dashboard 200, and the guide units 10 are configured to be moved integrally with the housing 100 along the rails 300 in the length direction of the vehicle. Further, the rails 300 are inclined at a designated angle downwards based on the length direction of the vehicle. Therefore, the glove box 10 is moved downwards along the inclined rails 300 so as to be withdrawn towards the interior of the vehicle.

At least one rail 300 is disposed on the inner surface of the opening in the dashboard 200 so as to support a guide part 110a and to precisely guide the slidable opening and closing operations of the housing 100. Further, the rail 300, which protrudes outwards from the housing 100, is depressed to have a complementary shape to accommodate the guide part 110a therein, and extends in the opening and closing direction of the housing 100.

Here, a clearance between the rail 300 and the guide part 110a which is fit into the rail 300 so as to be accommodated therein, i.e., a degree of looseness between the rail 300 and the guide part 110a, may be within the range of 1 mm to 2 mm so as to restrain excessive movement of the guide part 110a in the rail 300 while securing smooth sliding operation of the guide part 110a in the rail 300.

As described above, the movement of the guide part 110a due to the very small clearance between the guide part 110a and the rail 300, which may secure the smooth sliding operation of the guide part 110a, may be effectively restrained by the guide unit 100 which will be described later.

The depression of the rail 300 may be formed to have a uniform depth throughout the sliding operation range of the housing 100, or may be formed to have a depth which is gradually decreased in the direction of opening the housing 100.

Here, when the depth of the depression of the rail 300 is gradually decreased in the direction of opening the housing 100, the pressure of the guide unit 110, which will be described later, applied to the rail 300 is gradually increased in the direction of opening the housing 100, and thus the housing 100 is gradually decelerated until the housing 100 is completely opened, and is stably slid.

Further, the rail 300 may be disposed so as to be inclined downwards based on the horizontal plane of the vehicle, and such a downward inclined disposition allows the housing 100 to be slidably opened due to the load thereof without a separate damper or power device when locking of the housing 100 into the dashboard 200 is released.

A fixing part 111, which is elastically supported by the above-described guide part 110a, protrudes towards the rail 300 and pressurizes the rail 300 with a designated elastic force, thereby directly restricting the movement of the housing 100 during the opening and closing operations of the glove box 10.

The protrusion unit 120 is located at the upper end of the rear surface of the housing 100 so as to protrude in the height direction. More particularly, the protrusion unit 120 according to one exemplary embodiment of the present disclosure may include two protrusions 121.

The dashboard 200 may include a forming unit 210 formed on the upper surface thereof so as to correspond to the shape of the protrusions 121, and the forming unit 210 extends in the length direction of the vehicle in which the protrusions 121 are moved. More particularly, in one exemplary embodiment of the present disclosure, the forming unit 210 includes two forming parts 220, which are depressed, so that the two protrusions 121 are located in the two forming parts 220, respectively.

Figure 2:
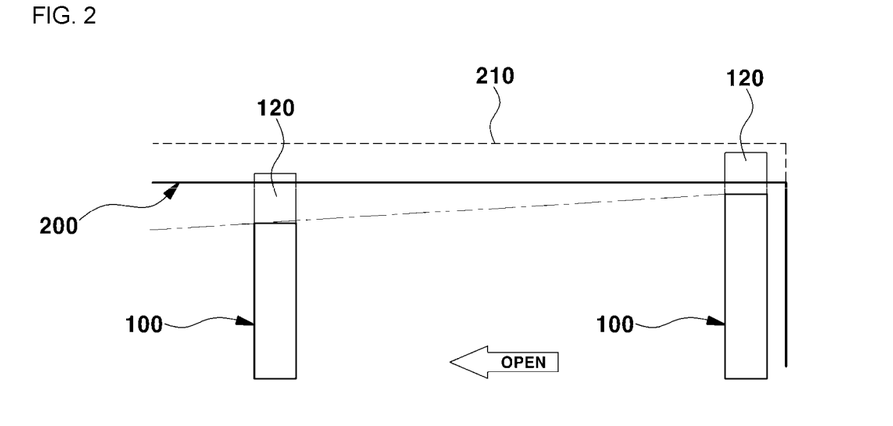
FIG. 2 is a longitudinal-sectional view of the glove box for vehicles according to one exemplary embodiment of the present disclosure, taken along line B-B of FIG. 1.

FIG. 2 is a longitudinal-sectional view of the glove box 10 which is moved along the inner surface of the opening in the dashboard 200.

As shown in this figure, the glove box 10 including the protrusions 121 is configured such that locking of the glove box 10 into the dashboard 200 is released and the glove box 10 is withdrawn towards the interior of the vehicle in response to user input through the handle 400. Here, the glove box 10 is moved along the inclined rails 300, and is then located at a position lower than in the state in which the glove box 10 is located in the dashboard 200.

The rails 300 are located on both inner side surfaces of the opening in the dashboard 200, and are coupled to the guide units 110 located on the side surfaces of the housing 100. The rails 300 are located in the length direction of the vehicle in which the glove box 10 is withdrawn towards the interior of the vehicle, and are inclined downwards based on the height of the vehicle as the rails 300 extend outside. Therefore, as the housing 100 of the glove box 10 is withdrawn, the housing 100 is moved downwards along the inclined rails 300.

The height by which the glove box 10 is moved downwards may be the height of the protrusions 121. More particularly, the height by which the glove box 10 is moved downwards in the state in which locking of the housing 100 into the dashboard 200 is released may be smaller than the height of the protrusions 121. Therefore, in the closed state of the glove box 10, the upper ends of the protrusions 121 are inserted into the forming units 210 formed in the upper surface of the dashboard 200. Further, when the glove box 10 is open, the protrusions 121 are guided along the forming units 210 of the dashboard 200. Moreover, when the glove box 10 is withdrawn towards the interior of the vehicle, the upper ends of the protrusions 121 is located most adjacent to the upper surface of the dashboard 400.

That is, in the closed state of the glove box 10, the upper ends of the protrusions 121 may be located adjacent to the upper ends of the forming units 210 and, in the open state of the glove box 10, the upper ends of the protrusions 121 may be located at a position most adjacent to the upper surface of the dashboard 400. More particularly, in the completely open state of the glove box 10, the upper ends of the protrusions 121 may still be located within the depressed spaces of the forming units 210. Therefore, the glove box 10 moved along the inclined rails 300 may be moved downwards by a height lower than the height of the protrusions 121, compared to in the closed state of the glove box 10.

Figure 3:
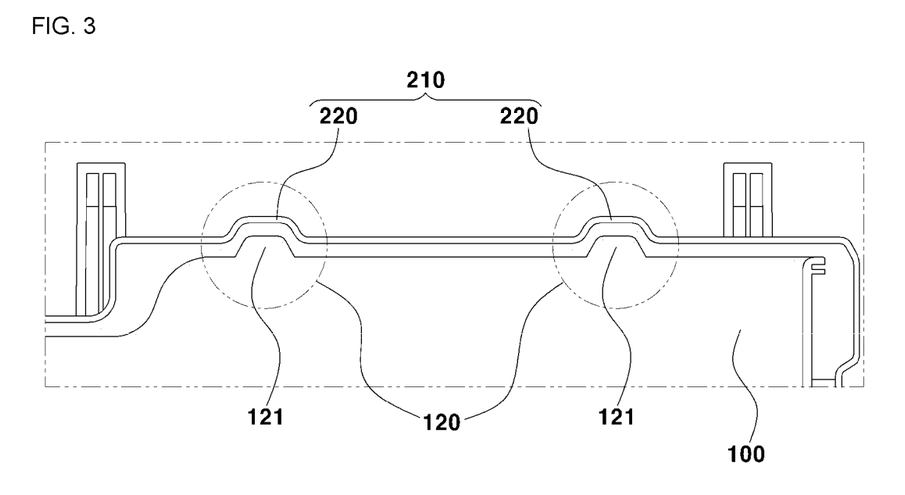
FIG. 3 is a longitudinal-sectional view of the glove box for vehicles according to one exemplary embodiment of the present disclosure, taken along line A-A of FIG. 1.

FIG. 3 is a longitudinal-sectional view of the glove box 10 according to one exemplary embodiment of the present disclosure, taken along line A-A.

As shown in this figure, in the process of opening the glove box 10, the two protrusions 121 of the protrusion unit 120 are moved along the inner depressed spaces of the forming parts 220 of the forming unit 200, which are formed by depressing the upper surface of the opening in the dashboard 200. More particularly, the protrusions 121 are moved along the inner depressed spaces of the forming parts 220 by a designated length, and thereafter, the upper ends of the protrusions 121 are located at a position higher than the upper surface of the dashboard 200 by a designated height.

The forming unit 210 is disposed in the length direction of the vehicle, i.e., the direction of opening the glove box 10, and includes the forming parts 220 provided in a number corresponding to the number of the protrusions 121. The protrusions 121 are moved in the length direction of the forming unit 210 during the process of opening the glove box 10 in the state in which at least a part of each of the protrusions 121 is inserted into a corresponding one of the forming parts 220 of the forming unit 210. The depressed region of each of the forming parts 220 of the forming unit 210 includes a space having a width and a height greater than those of the protrusions 121 so as not to interfere with the protrusions 121.

Further, in the closed state of the glove box 10, the upper ends of the protrusions 121 are substantially opposite the upper surfaces of the forming parts 220 of the forming unit 210. More particularly, in the closed state of the glove box 10, the upper ends of the protrusions 121 are located to be spaced apart from the upper surfaces of the forming parts 220 of the forming unit 210 by a designated distance. The protrusions 121 are moved along the forming parts 220 of the forming unit 210, which include the depressed regions having a greater width than the width of the protrusions 121.

In one exemplary embodiment of the present disclosure, the two protrusions 121 may be spaced apart from both side ends of the housing 100 by the same distance. Further, the protrusions 121 may be arranged so as to divide the width of the housing 100 into three equal parts.

Figure 4:
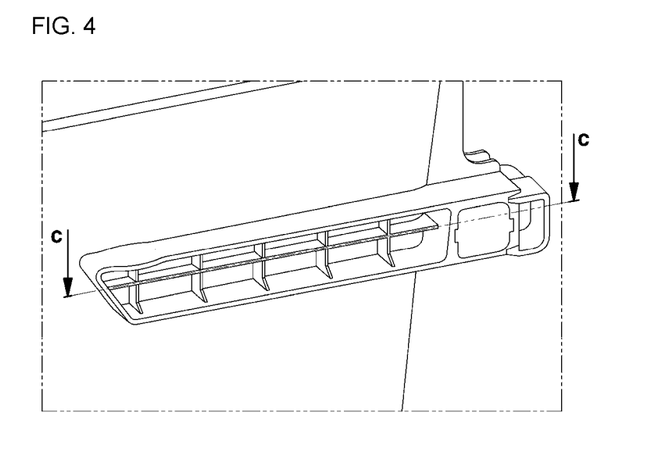
FIG. 4 is a perspective view of a fixing part, which is located on a guide unit, of the glove box for vehicles according to one exemplary embodiment of the present disclosure.
Figure 5:
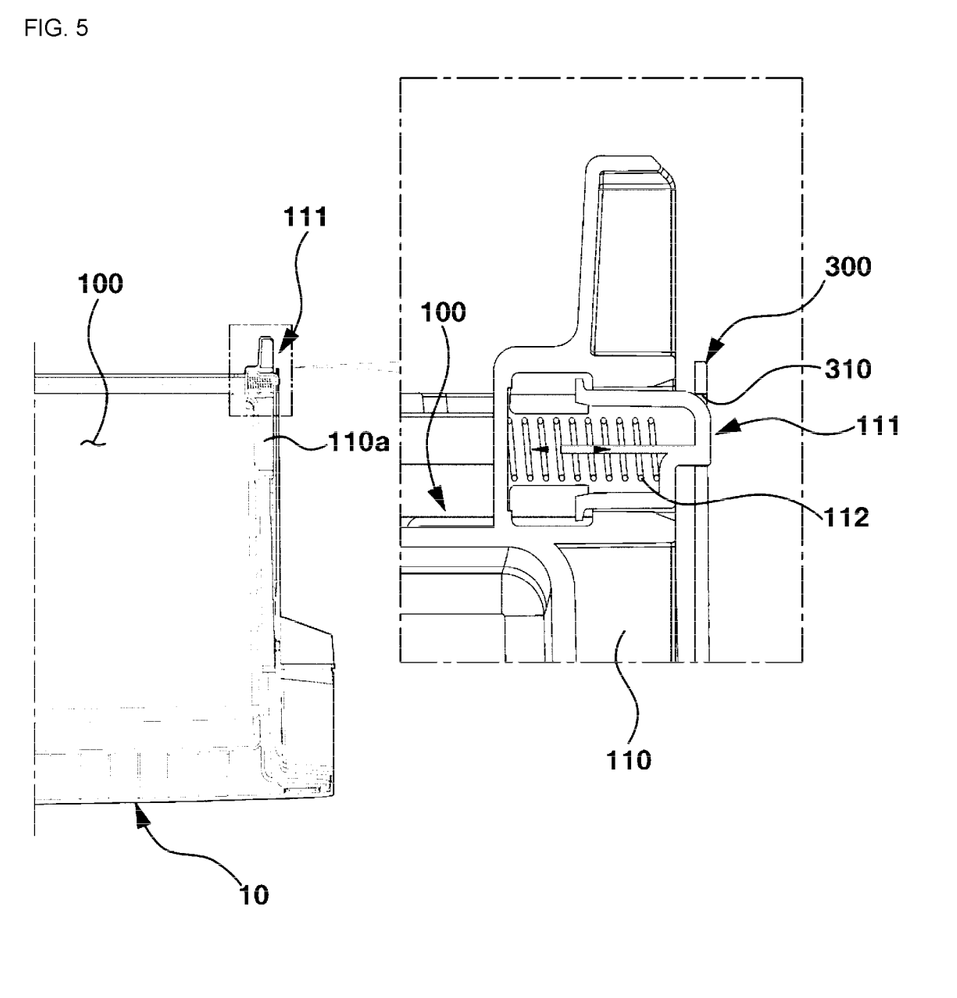
FIG. 5 illustrates a cross-sectional view of the glove box for vehicles according to one exemplary embodiment of the present disclosure, taken along line C-C of FIG. 1, and an enlarged view of a portion shown in alternated long and short dash line of FIG. 5.
Figure 6A:
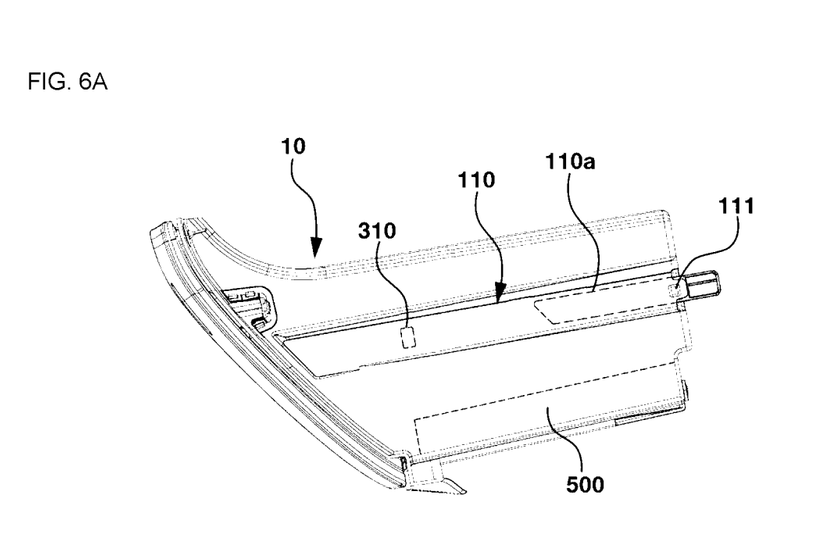
FIGS. 6A and 6B are views illustrating the operating state of the glove box for vehicles according to one exemplary embodiment of the present disclosure shown in FIG. 1.
Figure 6B:
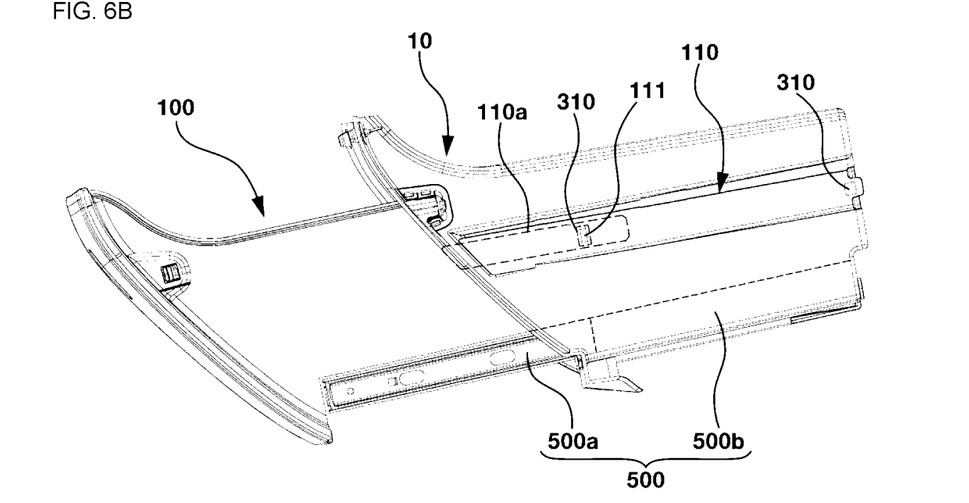

FIG. 4 and FIG. 5 illustrate the fixing part 111 located on the guide unit 110, and FIGS. 6A and 6B illustrate the state in which the fixing part 111 is inserted into an insertion recess 310 in the inserted state and the withdrawn state of the housing 100, respectively.

The guide units 110 are configured to be moved along the rails 300 located on both inner side surfaces of the opening in the dashboard 200, and the fixing part 111 is located on a part of each of the guide units 110. The fixing parts 111 are located in recesses formed in the guide units 111, and are provided opposite the rails 300 located on both inner side surfaces of the opening in the dashboard 200.

At least a portion of the fixing part 111 may be inserted into one of insertion recesses 310 formed in both ends of each of the rails 300 and, when tension in the length direction is applied, may provide a designated fixing force against the tension to the glove box 10. The insertion recesses 310 may be located at both ends of the rails 300 located on both inner side surfaces of the opening in the dashboard 200 at a position corresponding to the completely withdrawn state of the housing 100 and a position corresponding to the completely inserted state of the housing 100 of the glove box 10. More particularly, at least one pair of insertion recesses 310 may be located on each of the rails 300 at positions corresponding to the moved positions of the glove box 10.

Further, the fixing part 111 includes a support configured to contact the inside of the insertion recess 310 located in the guide unit 110 so as to apply tension from the insertion recess 310, and is configured such that, when the guide unit 100 is moved and thus located at a position at which the fixing part 111 is opposite the insertion recess 310 located in the rail 300, at least a portion of the fixing part 111 is inserted into the insertion recess 310 so as to fix the housing 100.

The support is configured to contact the inner surface of the recess located in the guide unit 110 and to push the fixing part 111 in a direction away from the guide unit 110 along the inner surface of the recess. More particularly, the support may include a spring 112 located in the recess, and may provide tension to the fixing part 111 through the elastic force of the spring 112.

Further, the length of the fixing part 111 protruding towards the guide unit 110 by the tension applied by the support is determined by force which moves the glove box 10 forwards and rearwards and, as the protruding length of the fixing part 111 increases, the glove box 10 may be stably fixed to the dashboard 200 against movement of the vehicle. Further, the protruding length of the fixing part 111 may be determined by the depth of the insertion recess 310 configured such that at least a portion of the fixing part 111 may be inserted thereinto.

The elastic force which locks the fixing part 111 in the insertion recess 310 may be smaller than the force which moves the glove box 10 in the length direction and thus, when the glove box 10 is moved, the fixing part 111 may be separated from the insertion recess 310 so as to be moved integrally with the glove box 10.

Further, the insertion recesses 310 may be configured such that at least one insertion recess 310 may be located on both inner side surfaces of the opening in the dashboard 200 along the rails 300, and may thus prevent movement of the glove box 10 withdrawn in response to a withdrawal amount of the glove box 10.

As such, in the present disclosure, the protrusion unit 120 located at the upper end of the rear surface of the housing 100 of the glove box 10 and the fixing parts 111 located on both side surfaces of the housing 100 are provided, thereby being capable of preventing stored goods from being released towards the rear end of the housing 100 and preventing movement of the withdrawn glove box 10.

Further, the guide parts 110a and the rails 300, as shown in FIGS. 6A and 6B, may be disposed so as to be inclined downwards based on a horizontal plane, and such a downward inclined disposition allows the housing 100 to be slidably opened due to the load thereof without a separate damper or power device when locking of the housing 100 into the dashboard 200 is released.

The fixing parts 111, which are elastically supported by the above-described guide parts 110a, protrude towards the rails 300 and pressurize the rails 300 with a designated elastic force, thereby directly restricting movement of the housing 100 during the opening and closing operations of the glove box 10.

The fixing part 111 according to one exemplary embodiment of the present disclosure may include, as shown in FIGS. 5A and 5B, one end which protrudes to contact the rail 300, and the other end which is hooked to an installation recess of the guide part 110a by the support, i.e., the spring 12, so as to be elastically supported by the spring 112 in the direction of the rail 300, and reciprocates.

Even though the housing 100 is relatively moved due to vibration transmitted from the engine of the vehicle, the fixing parts 111 having the above structure, which are installed so as to be elastically supported by the springs 112, may firmly maintain contact of the housing 100 with the rails 300 through contraction and protrusion of the fixing parts 111 in response to the movement of the housing 100, thereby effectively preventing buzz, squeak and rattle (BSR) noise, such as frictional sound, collision sound or the like.

The fixing part 111 may be inserted into one of the insertion recesses 310 formed in both ends of each of the rails 300 so as to fix the housing 100 in the open or closed state of the housing 100, as shown in FIGS. 6(a) and 6(b).

Here, the fixing part 111 fixedly inserted into the insertion recess 310 is contracted due to external force applied to the housing 110 (i.e., passenger force of pushing or pulling the housing 110) in the open or closed state, and may thus be released from the insertion recess 310.

The above-described fixing parts 111 and rails 300 may be respectively manufacturing through injection molding or double injection molding using engineering plastics, such as monomer casting nylon (MC nylon) having excellent corrosion resistance, insulating properties, shock absorbability and self-lubrication as well as excellent durability, Teflon having excellent water resistance, chemical resistance, thermal resistance and self-lubrication, rigid urethane having excellent oil resistance, cold resistance, shock resistance and wear resistance, and high elasticity, etc.

As such, when the fixing parts 111 and the rails 300 are manufactured using self-lubricating materials, even though the fixing parts 111 pressurize the rails 300 with a designated force, the housing 100 is capable of being smoothly slid.

Sliding rail units 500 may be installed between the housing 100 and the dashboard 200 so as to more firmly guide the opening and closing operations of the housing 100 with respect to the dashboard 200 together with the above-described guide parts 110a and the rails 300, and each sliding rail unit 500 may be a commercialized rail device including a first rail 500a and a second rail 500b, as shown in the figures.

Here, the first rail 500a is coupled to the lower end of the housing 100, and a second rail 500b is coupled to the inner surface of the opening in the dashboard 200, and then, the first and second rails 500a and 500b are slidably coupled to each other by a ball bearing, thereby uniformly guiding the opening and closing operations of the housing 100.

Further, the sliding rail units 400 may be configured to be inclined at the same angle as the rails 300.

Figure 7:
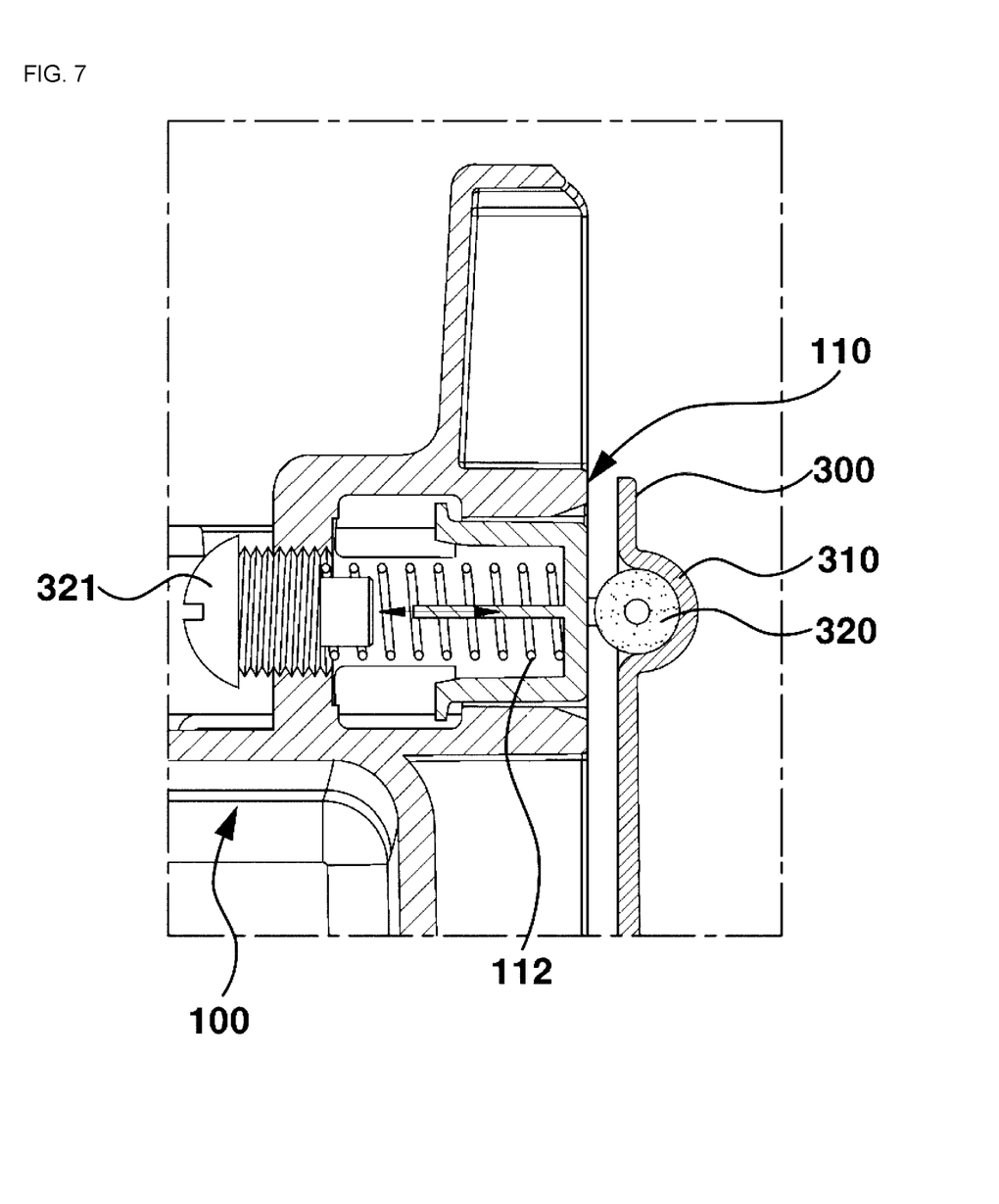
FIG. 7 is a view illustrating the structure of a guide unit of the glove box for vehicles according to one exemplary embodiment of the present disclosure.

The glove box 10 according to one exemplary embodiment of the present disclosure may further include an elastic roller 320 and an elastic adjustment screw 321 in addition to the structure of the guide unit 110, as shown in FIG. 7.

Here, the elastic roller 320 may be formed in a cylindrical shape by transforming one end of the fixing part 111 according to one embodiment so as to better facilitate sliding of the guide part 110a with respect to the rail 300.

The elastic roller 320 is formed by disposing a cylindrical member formed of an elastic material so as to be directly pressed against the rail 300 and then coupling the cylindrical member to one end of the fixing part 111 so as to be rotated depending on sliding of the housing 100, as shown in this figure.

Here, the insertion recess 310 of the present disclosure is formed to have a hemispherical cross-section so that half or more of the elastic roller 320 may be inserted into the insertion recess 310 so as to firmly fix the housing 100 in the open or closed state.

The elastic adjustment screw 321 is provided at the guide part 110a so as to variously adjust elastic force applied to the fixing part 111 (or the elastic roller 320) by the above-described spring 112.

The elastic adjustment screw 321 according to one exemplary embodiment of the present disclosure may be screwed to one side of the guide part 110a so as to compress or relax the spring 112 disposed in the installation space of the guide part 110a through forward or reverse rotation of the elastic adjustment screw 321, in order to elastically support the above-described fixing part 111 or the elastic roller 320, as shown in this figure.

Due to the above elastic adjustment screw 321, the housing 10 may be slid to open and close the glove box 10 at various degrees of sensitivity, as needed.

As is apparent from the above description, the present disclosure provides the following effects through the above-described configuration and connection and usage relations.

The present disclosure provides a glove box for vehicles which may minimize a clearance between the upper surface of a dashboard and the upper end of the inner surface of the housing so as to prevent release of stored goods.

Further, the glove box for vehicles according to the present disclosure may be easily moved, thereby increasing user convenience.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents. That is, while the present disclosure has been explained in relation to embodiments thereof, it is to be understood that various modifications thereof will become apparent to those skilled in the art upon reading the specification. These embodiments have been described to explain the best mode to implement the technical scope of the present disclosure, and various modifications required in the specific application and purpose of the present disclosure are possible. Therefore, the above detailed description of the present disclosure is not intended to limit the inventive concept(s) of the present disclosure. Further, it must be interpreted that the accompanying claims encompass other modes.

What is claimed is:

1. A glove box for vehicles configured to be inserted into a part of a dashboard and to be withdrawn therefrom, the glove box comprising:
   a housing having a storage space of the glove box; and
   guide units disposed on two side surfaces of the housing, respectively, and configured to move the housing along an inner surface of the dashboard,
   wherein each of the guide units comprises:
   a guide part configured to move along a corresponding one of rails located on two inner side surfaces of an opening formed in the part of the dashboard such that the housing is inserted into the opening; and
   a fixing part located on the guide part and inserted into an insertion recess located on one of the rails so as to prevent movement of the housing in a withdrawn state of the housing.

2. The glove box for vehicles of claim 1, further comprising:
   a protrusion unit located at an upper end of a rear surface of the housing and protruding along the upper end of the rear surface of the housing; and
   a forming unit located in an inner upper surface of the opening formed in the part of the dashboard,
   wherein at least a part of the protrusion unit is inserted into the forming unit and moved integrally with the housing.

3. The glove box for vehicles of claim 2, wherein:
   the protrusion unit comprises at least two protrusions extending along the upper end of the rear surface of the housing in a height direction thereof; and
   the forming unit comprises depressed regions corresponding to the at least two protrusions, and is configured to correspond to movement of the at least two protrusions.

4. The glove box for vehicles of claim 2, wherein, in a closed state of the housing, the protrusion unit is located adjacent to an upper surface of the depressed regions of the forming unit, and
   when the housing is converted into an open state along the forming unit, the protrusion unit is located adjacent to an upper surface of the dashboard.

5. The glove box for vehicles of claim 1, wherein the rails are inclined at a designated angle so that, when the housing is moved in a length direction thereof, the housing is moved downwards.

6. The glove box for vehicles of claim 2, wherein a height by which the housing is moved downwards is smaller than a height of the protrusion unit.

7. The glove box for vehicles of claim 2, wherein a width of the forming unit is greater than a width of the protrusion unit.

8. The glove box for vehicles of claim 1, wherein the fixing part is inserted into the insertion recess formed in at least one of two end portions of each of the rails so as to fix the housing in an open and/or closed state of the housing, and is released from the insertion recess by external force applied to the housing.

9. The glove box for vehicles of claim 1, wherein:
   an elastic roller pressed against the insertion recess and rotated depending on sliding of the housing is disposed at an end of the fixing part; and
   an elastic adjustment screw is screwed to the guide part to compress or relax a spring, which is configured to elastically support the fixing part, through forward or reverse rotation of the elastic adjustment screw so as to adjust elastic force applied to the fixing part.

10. The glove box for vehicles of claim 1, further comprising:
   sliding rail units installed between the housing and the dashboard so as to guide sliding of the housing.

* * * * *